United States Patent
McColloch et al.

(10) Patent No.: US 9,052,484 B2
(45) Date of Patent: Jun. 9, 2015

(54) CONNECTOR ASSEMBLY, A SYSTEM AND METHOD FOR INTERCONNECTING ONE OR MORE PARALLEL OPTICAL TRANSCEIVER MODULES WITH A SYSTEM CIRCUIT BOARD

(71) Applicant: Avago Technologies General IP (Singapore) Pte. Ltd., Singapore (SG)

(72) Inventors: Laurence R. McColloch, Santa Clara, CA (US); Faouzi Chaahoub, San Jose, CA (US); Georgios Asmanis, Lake Forest, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 13/661,150

(22) Filed: Oct. 26, 2012

(65) Prior Publication Data

US 2013/0287404 A1    Oct. 31, 2013

Related U.S. Application Data

(63) Continuation-in-part of application No. 13/460,833, filed on Apr. 30, 2012.

(51) Int. Cl.
*H04B 10/00* (2013.01)
*G02B 6/42* (2006.01)
*H04B 10/80* (2013.01)

(52) U.S. Cl.
CPC .............. *G02B 6/428* (2013.01); *G02B 6/4246* (2013.01); *H04B 10/801* (2013.01)

(58) Field of Classification Search
CPC ....... H04J 3/047; H04B 10/40; G02B 6/4201; G02B 6/4292; H01S 5/02448
USPC .......................................... 398/135, 138, 139
See application file for complete search history.

(56) References Cited

U.S. PATENT DOCUMENTS

| | | | |
|---|---|---|---|
| 6,625,241 B2 | 9/2003 | Mejiga | |
| 6,665,498 B1 | 12/2003 | Jiang et al. | |
| 6,850,663 B2 | 2/2005 | Kikuchi et al. | |
| 6,932,618 B1 * | 8/2005 | Nelson | 439/66 |
| 6,947,672 B2 | 9/2005 | Jiang et al. | |

(Continued)

OTHER PUBLICATIONS

Cole, Chris , "MLG (Multi-Link Gearbox) Project Start Proposal, Powerpoint Presentation", *Optical Internetworking Forum*, Fremont, United States Jul. 8, 2011, 1-13.

(Continued)

*Primary Examiner* — David Payne
*Assistant Examiner* — Pranesh Barua

(57) ABSTRACT

A connector assembly is provided that mates on one side with an optical transceiver module holder and that electrically connects on the opposite side with an external system circuit board. When the connector assembly is mated with an optical transceiver module holder, a base of a parallel optical transceiver module held in the holder mates with a socket of the connector assembly such that respective arrays of electrical contacts disposed on the base and in the socket come into contact with one another. At least one gearbox IC for performing data rate conversion is mounted on the assembly circuit board. A lower surface of the assembly circuit board has an array of electrical contacts on it that are in contact with an array of electrical contacts disposed on the surface of the external system circuit board on which the connector assembly is mounted.

21 Claims, 9 Drawing Sheets

(56) References Cited

U.S. PATENT DOCUMENTS

| | | | |
|---|---|---|---|
| 6,982,879 B1* | 1/2006 | Franca-Neto et al. | 361/803 |
| 7,050,468 B2 | 5/2006 | Seto et al. | |
| 7,329,054 B1* | 2/2008 | Epitaux et al. | 385/89 |
| 7,380,993 B2 | 6/2008 | Dallesasse | |
| 7,539,366 B1* | 5/2009 | Baks et al. | 385/14 |
| 7,729,581 B2* | 6/2010 | Rolston et al. | 385/52 |
| 7,783,206 B2 | 8/2010 | Reyna et al. | |
| 7,835,648 B2 | 11/2010 | Hofmeister et al. | |
| 7,860,400 B2 | 12/2010 | Cole | |
| 8,047,856 B2 | 11/2011 | McColloch | |
| 8,078,058 B2 | 12/2011 | Zhang et al. | |
| 8,223,768 B2 | 7/2012 | Handelman | |
| 8,340,123 B2 | 12/2012 | Barbieri et al. | |
| 8,382,384 B2* | 2/2013 | Nekado et al. | 385/92 |
| 8,433,202 B2 | 4/2013 | Way | |
| 8,666,257 B2 | 3/2014 | Daghighian et al. | |
| 2003/0053768 A1* | 3/2003 | Brezina et al. | 385/92 |
| 2004/0028164 A1 | 2/2004 | Jiang et al. | |
| 2005/0084269 A1 | 4/2005 | Dallesasse et al. | |
| 2005/0156310 A1* | 7/2005 | Benner et al. | 257/712 |
| 2008/0095541 A1* | 4/2008 | Dallesasse | 398/191 |
| 2008/0107422 A1* | 5/2008 | Cole | 398/135 |
| 2008/0205437 A1* | 8/2008 | Cole | 370/464 |
| 2008/0240648 A1* | 10/2008 | Im | 385/14 |
| 2008/0292322 A1 | 11/2008 | Daghighian et al. | |
| 2009/0317086 A1 | 12/2009 | Morohashi et al. | |
| 2010/0008679 A1 | 1/2010 | Cole et al. | |
| 2010/0021166 A1 | 1/2010 | Way | |
| 2010/0266236 A1* | 10/2010 | Meadowcroft et al. | 385/14 |
| 2010/0272440 A1 | 10/2010 | Haran et al. | |
| 2010/0284698 A1* | 11/2010 | McColloch | 398/135 |
| 2010/0303423 A1 | 12/2010 | McColloch | |
| 2011/0026888 A1* | 2/2011 | Nekado et al. | 385/92 |
| 2011/0195589 A1* | 8/2011 | Takahashi | 439/342 |
| 2012/0170927 A1 | 7/2012 | Huang et al. | |
| 2013/0259478 A1 | 10/2013 | Komaki | |
| 2013/0287394 A1 | 10/2013 | Chaahoub et al. | |
| 2014/0010546 A1 | 1/2014 | Chaahoub et al. | |

OTHER PUBLICATIONS

Dove, Dan et al., "Next Generation 100 Gigabit Optical Ethernet", *Powerpoint Presentation, IEEE*, San Francisco, United States Jul. 2011, 1-33.

Gabriel, Steve et al., "Gennum and Altera Demonstrate 4×25Gb/s ICs for Next-Generation 100Gb/s Networks", *Press Release, Altera Corporation*, San Jose, United States Sep. 19, 2011, 1.

Harpinder, S. Matharu , "100G Dual Gearbox: Improving Port Density On Line Cards In Core Network Equipment", *White Paper. Virtex-7 HT FPGAs*, vol. 1, *Xilinx*, San Jose, United States Mar. 1, 2012, 1-10.

Kromer, Christian et al., "A 100-mW 4 ×10 Gb/s Transceiver in 80-nm CMOS for High-Density Optical Interconnects", *IEEE Journal of Solid-State Circuits*, vol. 40, No. 12 Dec. 2005, 2667-2679.

FCI MEG-Array Connectors Perform up to 28Gbps for Next-Generation Pluggable Optical Receivers, Press Release, Apr. 11, 2012, FCI.

Chen Ji, Jingyi Wang, David Soderstrom, Kuo-Liang Chen, Ramana Murty, Mark Keever, Laura Giovane, Jeong-Ki Hwang, Gim-Hong Koh, Jason Tan, Jason Chu, High vol. 850nm Oxide VCSEL Development for High Bandwidth Optical Data Link Applications, Article, 2009, p. 1-11, vol. 7229, Society of Photo-Optical Instrumentation Engineers.

* cited by examiner

CONNECTOR ASSEMBLY, A SYSTEM AND METHOD FOR INTERCONNECTING ONE OR MORE PARALLEL OPTICAL TRANSCEIVER MODULES WITH A SYSTEM CIRCUIT BOARD

CROSS-REFERENCE TO RELATED APPLICATIONS

This application is a continuation-in-part application of application Ser. No. 13/460,833, filed on Apr. 30, 2012 and entitled "A HIGH-SPEED OPTICAL FIBER LINK AND A METHOD FOR COMMUNICATING OPTICAL DATA SIGNALS OVER THE HIGH-SPEED OPTICAL FIBER LINK," which is incorporated by reference herein in its entirety.

TECHNICAL FIELD OF THE INVENTION

The invention relates to optical communications. More particularly, the invention relates to a connector assembly for interconnecting one or more parallel optical transceiver modules with a system circuit board.

BACKGROUND OF THE INVENTION

In an optical communication system, it is generally necessary to couple an optical fiber to an optical communications device (i.e., an optical transmitter, receiver or transceiver device), and to, in turn, couple the device to an electronic system such as a switching system or processing system. These connections can be facilitated by modularizing the optical communications device. Such modules include a housing in which are mounted opto-electronic elements, optical elements, and electronic elements, such as one or more light sources (e.g., lasers), light sensors (e.g., photodiodes), lenses and other optics, digital signal driver and receiver circuits, etc. In addition, an optical communications module typically includes an optical connector that can be coupled to a mating connector at the end of a fiber-optic cable. Various optical communications module configurations are known.

In switching systems that are commonly used in optical communications networks, each optical transceiver module is typically mounted on a circuit board that is interconnected with another circuit board that is part of a backplane of the switching system. The backplane typically includes many circuit boards that are electrically interconnected with one another. In many such switching systems, each circuit board of the backplane has at least one application specific integrated circuit (ASIC) mounted on it and electrically connected to it. Each ASIC is electrically interconnected with a respective optical transceiver module via electrically-conductive traces of the respective circuit boards. In the transmit direction, each ASIC communicates electrical data signals to its respective optical transceiver module, which then converts the electrical data signals into respective optical data signals for transmission over the optical fibers that are connected to the optical transceiver module.

In the receive direction, the optical transceiver module receives optical data signals coupled into the module from respective optical fibers and converts the respective optical data signals into respective electrical data signals. The electrical data signals are then output from the module and are received at respective inputs of the ASIC, which then processes the electrical data signals. The electrical interconnections on the circuit boards connect inputs and outputs of each ASIC to outputs and inputs, respectively, of each respective optical transceiver module. These electrical interconnections are typically referred to as lanes.

FIG. 1 illustrates a block diagram of a known optical communications system 2 of a known switching system. The optical communications system 2 comprises a first circuit board 3, an optical transceiver module 4 mounted on the first circuit board 3, a backplane circuit board 5, and an ASIC 6 mounted on the backplane circuit board 5. Four output optical fibers 7 and four input optical fibers 8 are connected to the optical transceiver module 4. In the transmit direction, the ASIC 6 produces four 10 gigabit per second (Gpbs) electrical data signals, which are output from the ASIC 6 onto four respective output lanes 9 to the optical transceiver module 4. The optical transceiver module 4 then converts the four 10 Gbps electrical data signals into four respective 10 Gbps optical data signals and couples them into the ends of four respective optical fibers 7 for transmission over the optical fiber link.

In the receive direction, four 10 Gbps optical data signals are coupled from the ends of four respective optical fibers 8 into the optical transceiver module 4, which then converts the optical data signals into four 10 Gbps electrical data signals. The four 10 Gbps electrical data signals are then output over four respective input lanes 11 to four respective inputs of the ASIC 6 for processing by the ASIC 6. Thus, the optical fiber link has a data rate of 40 Gbps in the transmit direction and 40 Gbps in the receive direction. The data rate of the optical fiber link can be increased by increasing the number of optical transceiver modules 4 and ASICs 6 that are included in the link. For example, if four optical transceiver modules 4 and four ASICs 6 are included in the optical communications system 2, the optical fiber link will have a data rate of 160 Gbps in the transmit direction and 160 Gbps in the receive direction.

Demands for greater bandwidth often lead to efforts to upgrade optical communications networks to achieve higher data rates. Doing so, however, typically requires either duplicating the number of optical transceiver modules and ASICs that are used in the optical communications system or replacing them with optical transceivers and ASICs that operate at higher data rates. Of course, duplicating the number of optical transceiver modules and ASICs that are used in the optical communications system is a very costly solution. Replacing the ASICs with ASICs that operate at higher data rates requires redesigning the ASIC, which also is a very costly solution. It would be desirable to provide a way to substantially increase the bandwidth of an optical fiber link of an optical communications network without having to duplicate the number of optical transceiver modules and ASICs that are employed and without having to redesign the ASIC.

SUMMARY OF THE INVENTION

Embodiments of the present invention relate to a connector assembly, an optical communications system that incorporates the connector assembly, and a method. The connector assembly is configured to interconnect one or more parallel optical transceiver modules with a system circuit board. The connector assembly comprises an assembly housing, an assembly circuit board attached to the assembly housing, and at least a first gearbox IC for performing data rate conversion mounted on the assembly circuit board.

The assembly housing has at least a first socket recess formed in an upper surface of the assembly housing for receiving a base portion of a first parallel optical transceiver module. The first socket recess has a shape substantially corresponding to a shape of the base portion of the first parallel optical transceiver module. The assembly circuit board has an upper surface and a lower surface. The assembly housing covers the upper surface of the assembly circuit board except where the socket recess or recesses are formed in the upper surface of the assembly housing. A first area of the upper surface of the assembly circuit board is exposed through the first socket recess, and at least a first socket is disposed on the exposed first area. The first socket comprises a first array of electrical contacts for making electrical contact with a second array of electrical contacts disposed on a lower surface of the base portion of the first parallel optical transceiver module when the base portion is received in the first socket recess.

The lower surface of the assembly circuit board has a third array of electrical contacts disposed thereon for making contact with a fourth array of electrical contacts disposed on an upper surface of the system circuit board when the connector assembly is mounted on the upper surface of the system circuit board. The first gearbox IC is mounted on and electrically connected to the assembly circuit board. The first gearbox IC is electrically connected to the first array of electrical contacts via electrical traces of the assembly circuit board.

The system comprises the connector assembly mounted on and electrically connected to a system circuit board. The system circuit board has at least a first array of electrical contacts disposed on an upper surface of the system circuit board. At least a first ASIC is mounted on the system circuit board and electrically connected thereto. The connector assembly comprises an assembly housing and an assembly circuit board attached to the assembly housing. The assembly housing has at least a first socket recess formed in an upper surface of the assembly housing for receiving a base portion of a first parallel optical transceiver module. A first area of an upper surface of the assembly circuit board is exposed through the first socket recess, and the first socket is disposed on the exposed first area. The first socket comprises a second array of electrical contacts. The assembly circuit board has a third array of electrical contacts disposed on a lower surface thereof that is electrically connected to the first array disposed on the system circuit board.

A parallel optical transceiver module holder of the system is mechanically coupled to the assembly housing. The module holder holds at least the first parallel optical transceiver module such that the base portion of the first parallel optical transceiver module is disposed in the first socket recess. A fourth array of electrical contacts disposed on a lower surface of the base portion is in contact with the second array of electrical contacts of the first socket. At least a first gearbox IC for performing data rate conversion is mounted on and electrically connected to the assembly circuit board. The first gearbox IC is electrically connected to the second array of electrical contacts via electrical traces of the assembly circuit board.

The method comprises providing a system circuit board having at least the first ASIC mounted on a surface thereof and mounting a connector assembly on a surface of the system circuit board. The system circuit board has a first array of electrical contacts disposed on a surface thereof. The connector assembly comprises an assembly housing and an assembly circuit board attached to the assembly housing. The assembly circuit board has a second array of electrical contacts disposed on a lower surface thereof that is in contact with the first array of electrical contacts of the system circuit board. The assembly housing has at least a first socket recess formed in an upper surface thereof for receiving a base portion of a first parallel optical transceiver module. A first area of an upper surface of the assembly circuit board is exposed through the first socket recess, and the first socket is disposed on the exposed first area. The first socket comprises a third array of electrical contacts.

A parallel optical transceiver module holder is mechanically coupled to the assembly housing. The module holder holds at least the first parallel optical transceiver module such that a base portion of the first parallel optical transceiver module is disposed in the first socket recess. A fourth array of electrical contacts disposed on a lower surface of the base portion is in contact with the third array of electrical contacts of the first socket. A first gearbox IC for performing data rate conversion is mounted on and electrically connected to the assembly circuit board. The first gearbox IC is electrically connected to the third array of electrical contacts via electrical traces of the assembly circuit board.

These and other features and advantages of the invention will be described below in detail with reference to illustrative embodiments shown in the figures.

DETAILED DESCRIPTION OF ILLUSTRATIVE EMBODIMENTS

Figure 1:
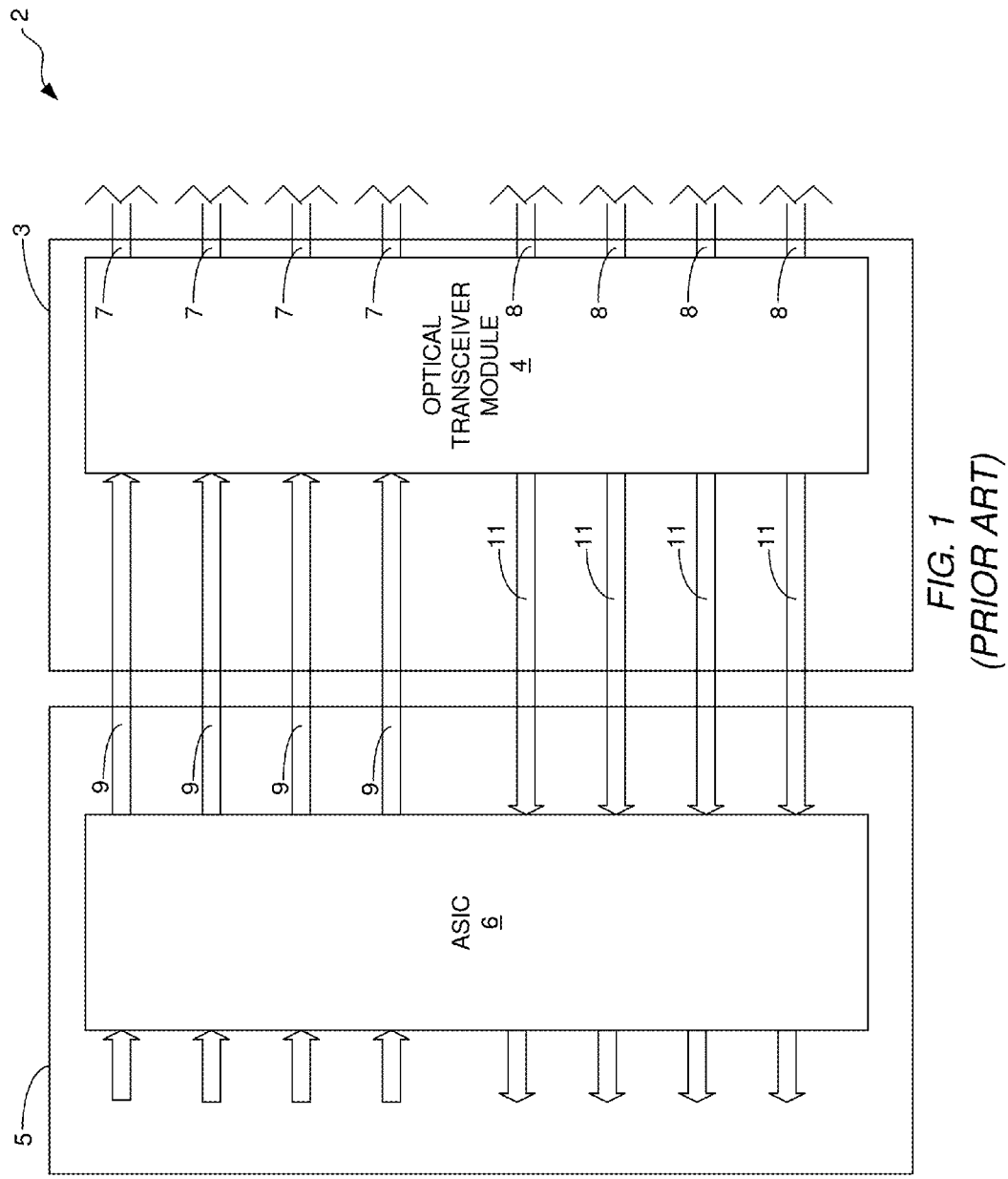
FIG. 1 illustrates a block diagram of a known optical communications system of a known switching system.

In accordance with illustrative embodiments described herein, a connector assembly is provided that is configured to mate on one side with an optical transceiver module holder and to electrically connect on the opposite side with an external system circuit board. The connector assembly has an assembly housing, an assembly circuit board disposed within the housing, at least one socket disposed on the upper surface of the assembly circuit board, and at least one gearbox IC mounted on the upper surface of the assembly circuit board and electrically interconnected with the socket via one or more interconnection layers of the module circuit board. When the connector assembly is mated with the holder, a base of a parallel optical transceiver module held in the holder mates with the socket of the connector assembly. The socket and the base have respective arrays of electrical contacts that come into contact with one another when the base mates with the socket. A lower surface of the assembly circuit board has an array of electrical contacts on it such that when the connector assembly is mounted on an external system circuit board, respective electrical contacts of the array disposed on the lower surface of the assembly circuit board come into contact with respective electrical contacts of an array disposed on an upper surface of the external system board.

The gearbox IC is compatible with current ASIC designs currently used in optical fiber links. When the connector assembly and the optical transceiver module holder are mated together and mounted on an external system circuit board of an optical communications system, the gearbox IC enables the optical communications system to achieve a data rate that at least doubles the data rate of the aforementioned known optical fiber link. Thus, the data rate of the optical fiber link is dramatically increased without requiring a redesign of the ASIC that is currently used in the optical fiber link. The gearbox IC is configured to interface with one or more ASICs of the current ASIC design and to interface with a high-speed parallel optical transceiver module.

Typically, the connector assembly and the module holder will be mated with one another prior to shipment to a customer, or shipped to the customer as separate parts and then mated together by the customer. The customer mounts the mated assembly on the customer's system circuit board. One of the advantages of including the gearbox IC in the connector assembly is that it obviates the need for the customer to mount the gearbox IC on the customer's system circuit board and make the necessary electrical connections between the system circuit board and the gearbox IC. This reduces the routing requirements of the system circuit board. In addition, including the gearbox IC in the connector assembly allows the lengths of the electrical connections between the gearbox ICs and the optical transceiver modules to be kept relatively short, which is very important to achieving high signal integrity. Achieving high signal integrity is critical to achieving high data rates.

In the transmit direction, the gearbox IC receives N lanes of electrical data signals from one or more ASICs, with each electrical data signal having a data rate of X Gbps, and outputs N/2 lanes of electrical data signals, with each electrical data signal having a data rate of 2X Gbps, where N is a positive integer that is equal to or greater than 2 and X is a positive number that is equal to or greater than 1. The high-speed parallel optical transceiver module receives the N/2 electrical data signals output from the gearbox IC, produces N/2 respective optical data signals and outputs the optical data signals onto N/2 optical fibers, with each optical data signal having a data rate of 2X.

In the receive direction, the high-speed parallel optical transceiver module receives N/2 optical data signals over N/2 optical fibers and converts them into N/2 respective electrical data signals, each having a data rate of 2X Gpbs. The N/2 electrical data signals are then received over N/2 lanes at respective inputs of the gearbox IC, which converts the N/2 electrical data signals into N electrical data signals, each having a data rate of X. The gearbox IC then outputs the N electrical data signals onto N lanes for delivery to respective inputs of the ASIC(s). The ASIC(s) then processes the electrical data signals in the normal manner.

For example, if the total number of data lanes that are output from all of the ASICs is equal to four (i.e., N=4), with each electrical data signal having a data rate of 10.3125 Gbps (i.e., X=10), then the gearbox IC will output two lanes of electrical data signals, with each electrical data signal having a data rate of 20.625 Gbps. As is typical in the optical communications industry, a data rate of 10.3125 Gbps will be referred to herein as simply 10 Gbps and the data rate of 20.625 Gbps will be referred to herein simply as 20 Gbps. The high-speed optical transceiver module converts each electrical data signal into an optical data signal at the same data rate as the electrical data signal and outputs the optical data signal onto an optical fiber. In the receive direction, the optical transceiver module receives two optical data signals, each having a data rate of 20 Gbps, and converts them into two electrical data signals, each having a data rate of 20 Gbps. The optical data signals are the delivered over two lanes to the gearbox IC, which converts them into four electrical data signals, each having a data rate of 10 Gbps. The four 10 Gbps electrical data signals are then delivered over four respective lanes to the ASICs, which process the electrical data signals in the normal manner.

Thus, incorporation of the gearbox IC into the optical communications system allows one or more ASICs of an existing design to be used with a high-speed optical transceiver module to achieve a data rate for the optical fiber link that is at least double the previous data rate of the link. These and other features and advantages of the invention will now be described with reference to the illustrative, or exemplary, embodiments shown in FIGS. 2-7, in which like reference numerals represent like elements or features.

Figure 2:
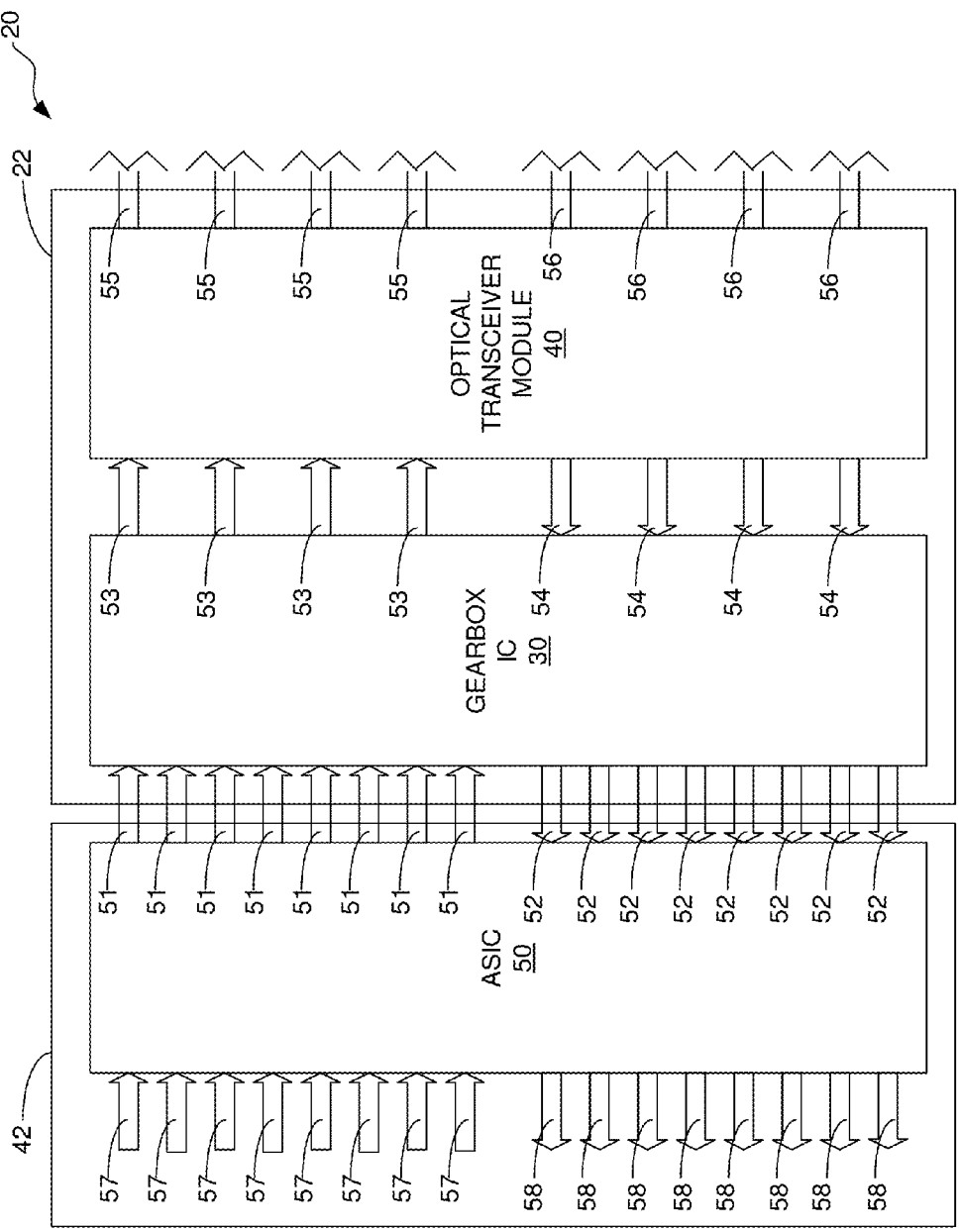
FIG. 2 illustrates a block diagram of an optical communications system located on one end of the high-speed optical fiber link in accordance with one illustrative, or exemplary, embodiment of the invention.

FIG. 2 illustrates a block diagram of an optical communications system 20 located on one end of the high-speed optical fiber link in accordance with one illustrative, or exemplary, embodiment of the invention. The optical communications system 20 comprises a first circuit board 22, a gearbox IC 30 electrically connected to the first circuit board 22, a high-speed optical transceiver module 40 electrically connected to the first circuit board 22, a backplane circuit board 42, and one or more ASICs 50 mounted on and electrically connected to the backplane circuit board 42. In accordance with this illustrative embodiment, the one or more ASICs 50 corresponds to two of the ASICs 6 shown in FIG. 1, although the one or more ASICs 50 could be a single ASIC or more than two ASICs. For ease of illustration, the one or more ASICs 50 are represented as a single block in the block diagram of FIG. 2.

In accordance with the illustrative embodiment shown in FIG. 2, N=8 and X=10 Gbps. Therefore, there are eight output lanes 51 interconnecting the ASIC 50 and the gearbox IC 30 and eight input lanes 52 interconnecting the ASIC 50 and the gearbox IC 30. There are four output lanes 53 interconnecting the gearbox IC 30 and the optical transceiver module 40 and four input lanes 54 interconnecting the optical transceiver module 40 and the gearbox IC 30. There are four output optical fibers 55 and four input optical fibers 56 optically and mechanically coupled to the optical transceiver module 40.

In the transmit direction, eight 10 Gbps electrical data signals are output on the output lanes 51 from the ASIC 50 to the gearbox IC 30. The gearbox IC 30 converts the eight 10 Gbps electrical data signals into four 20 Gbps electrical data signals and outputs the four 20 Gbps electrical data signals onto output lanes 53 to the optical transceiver module 40.

The optical transceiver module 40 converts each 20 Gbps electrical data signal into a 20 Gbps optical data signal and outputs the optical data signals onto output optical fibers 55. In the receive direction, the optical transceiver module 40 receives four 20 Gbps optical data signals output from the ends of the four input optical fibers 56 and converts them into four 20 Gbps electrical data signals. The four 20 Gbps optical data signals are then delivered over the four input lanes 54 to the gearbox IC 30, which converts the four 20 Gbps electrical data signals into eight 10 Gbps electrical data signals. The eight 10 Gbps electrical data signals are then delivered over the eight input lanes 52 to the ASIC 50, which processes the 10 Gbps electrical data signals in the known manner in which the ASIC 6 shown in FIG. 1 processes 10 Gbps electrical data signals.

On the backplane side of the ASIC 50, there are typically eight 10 Gbps input lanes 57 and eight 10 Gbps output lanes 58 for communicating with other ASICs 50 and/or other gearbox ICs 30 of other optical communications systems that are identical to optical communications system 20 and located either within the same switching system or in other switching systems. Furthermore, another instance of the gearbox IC 30 may be added to the backplane side to double the data rate of the electrical data signals that are communicated between ASICs 50 of the backplane.

The invention is not limited to the ASIC 50, the gearbox IC 30 or the optical transceiver module 40 having any particular configurations, any particular number of input and output lanes, or any particular number of channels. For example, the gearbox IC 30 could be configured to interface on one side with an ASIC that outputs data over more lanes than the ASIC 50 and on the opposite side with an optical transceiver module that has a greater number of channels than the optical transceiver module 40.

Figure 3:
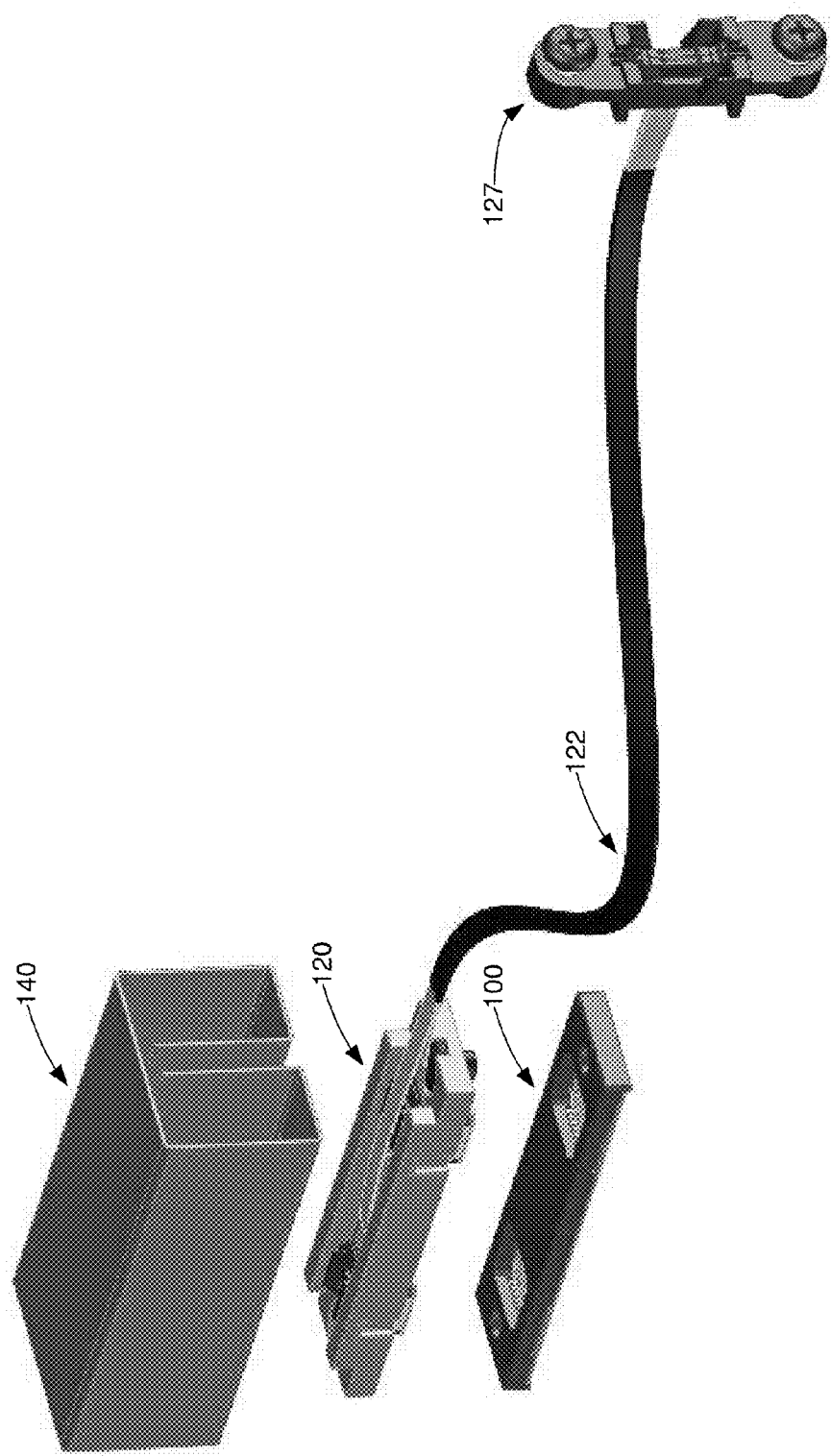
FIG. 3 illustrates an exploded perspective view of a connector assembly, a parallel optical transceiver module holder, and a heat sink device, in accordance with an illustrative embodiment.
Figure 4A:
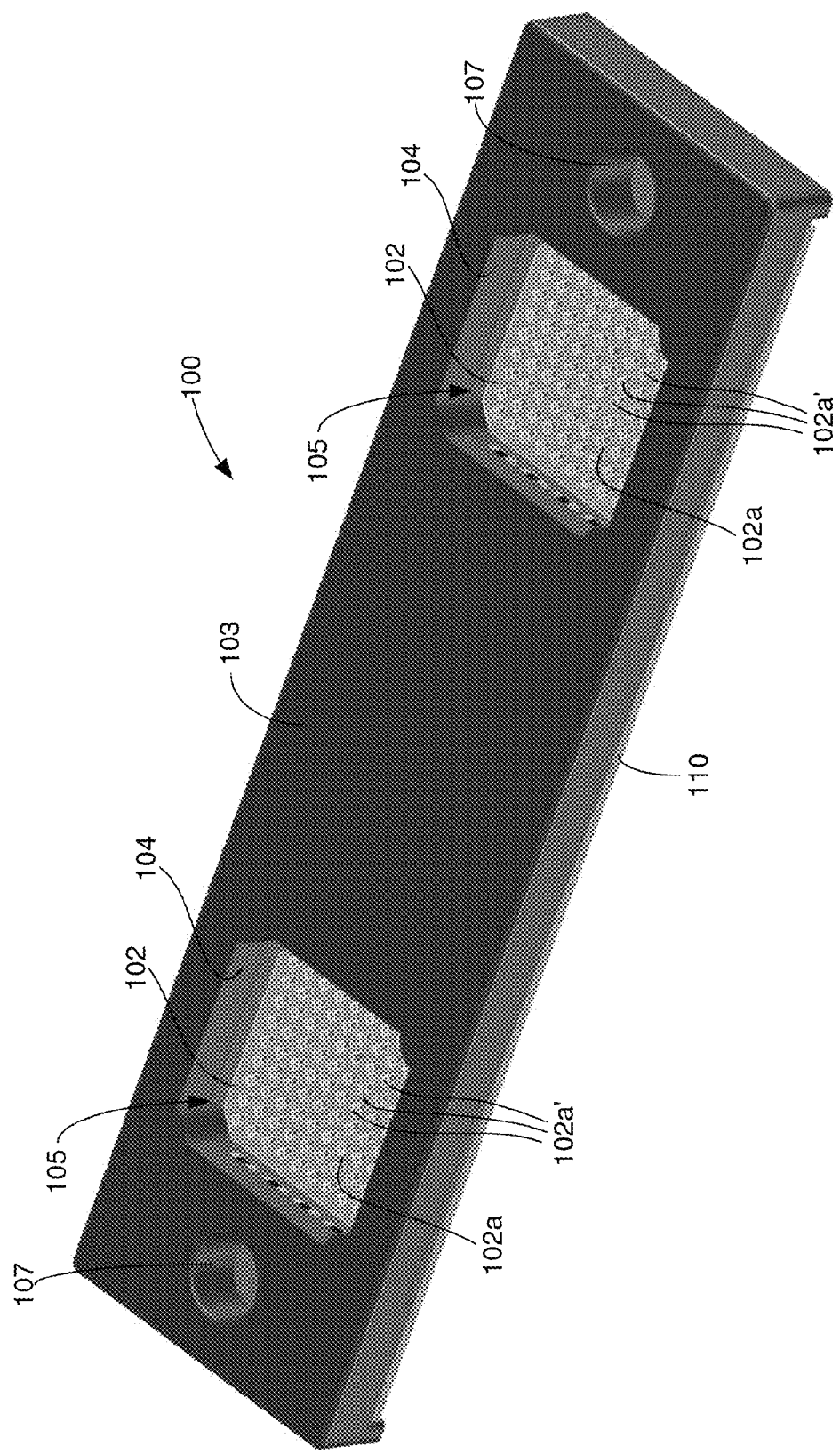
FIGS. 4A and 4B illustrate top and bottom perspective views, respectively, of the connector assembly shown in FIG. 3.
Figure 4B:
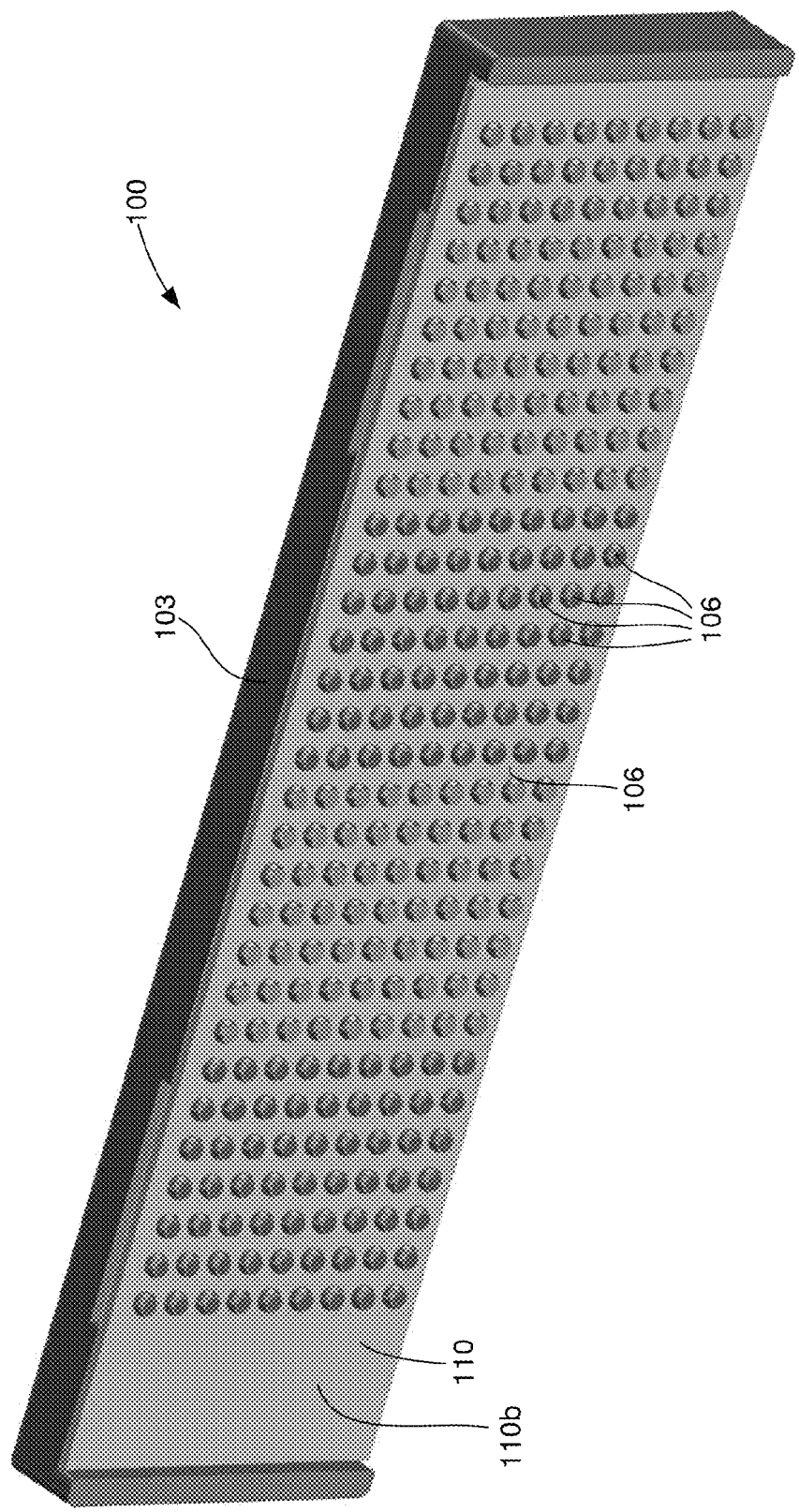
Figure 5:
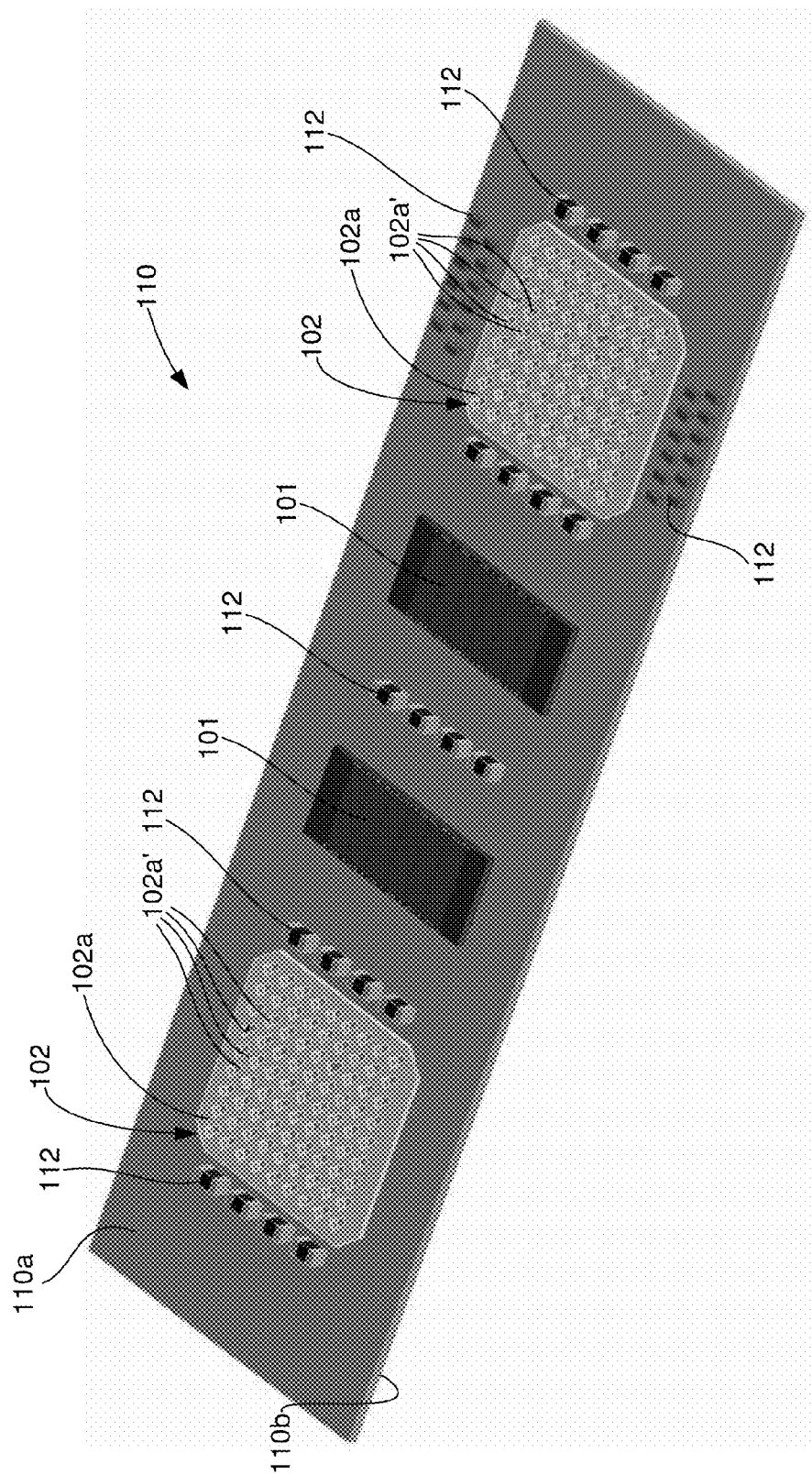
FIG. 5 illustrates a top perspective view of an assembly circuit board of the connector assembly shown in FIGS. 4A and 4B.
Figure 6A:
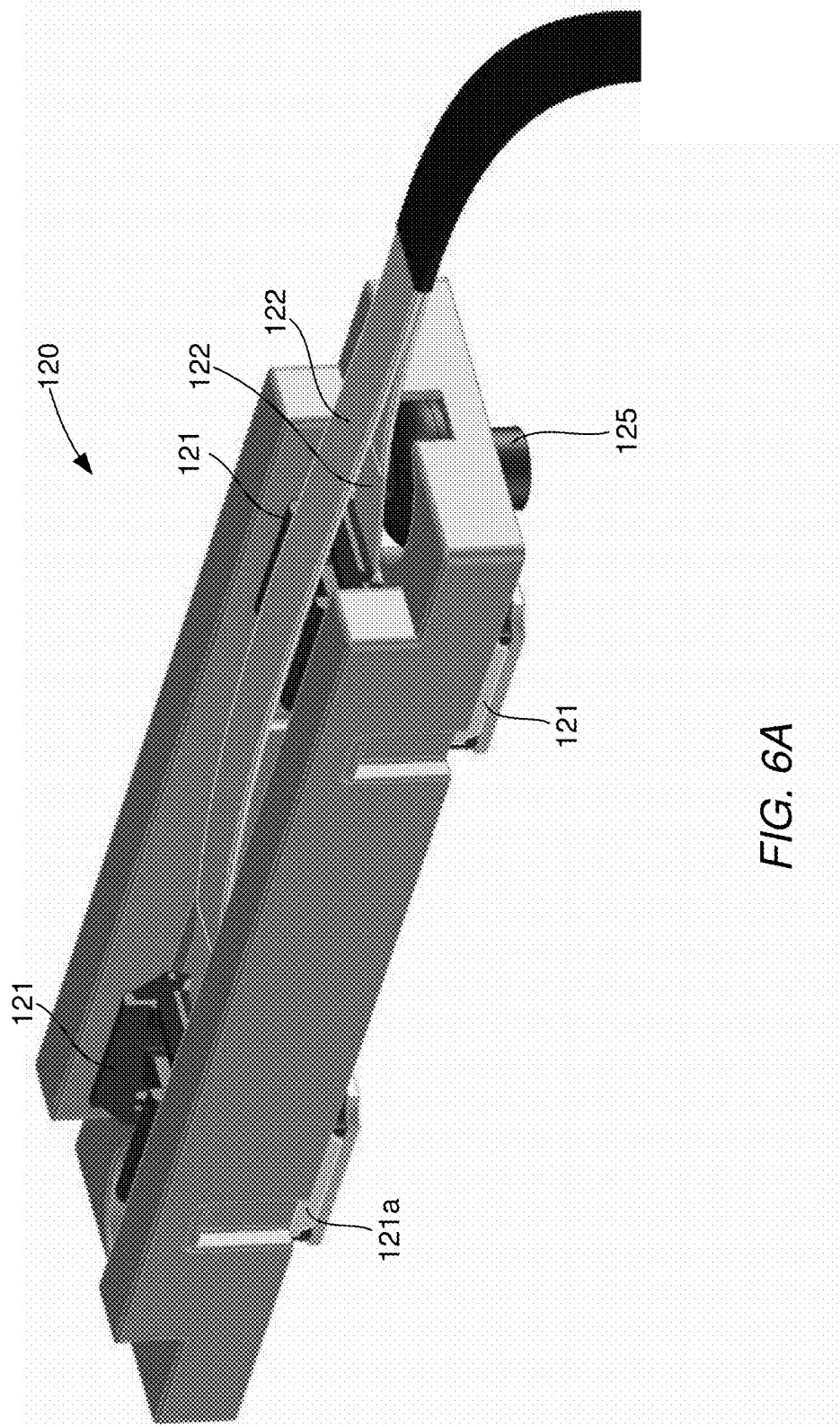
FIGS. 6A and 6B illustrate top and bottom perspective views, respectively, of the module holder shown in FIG. 3.
Figure 6B:
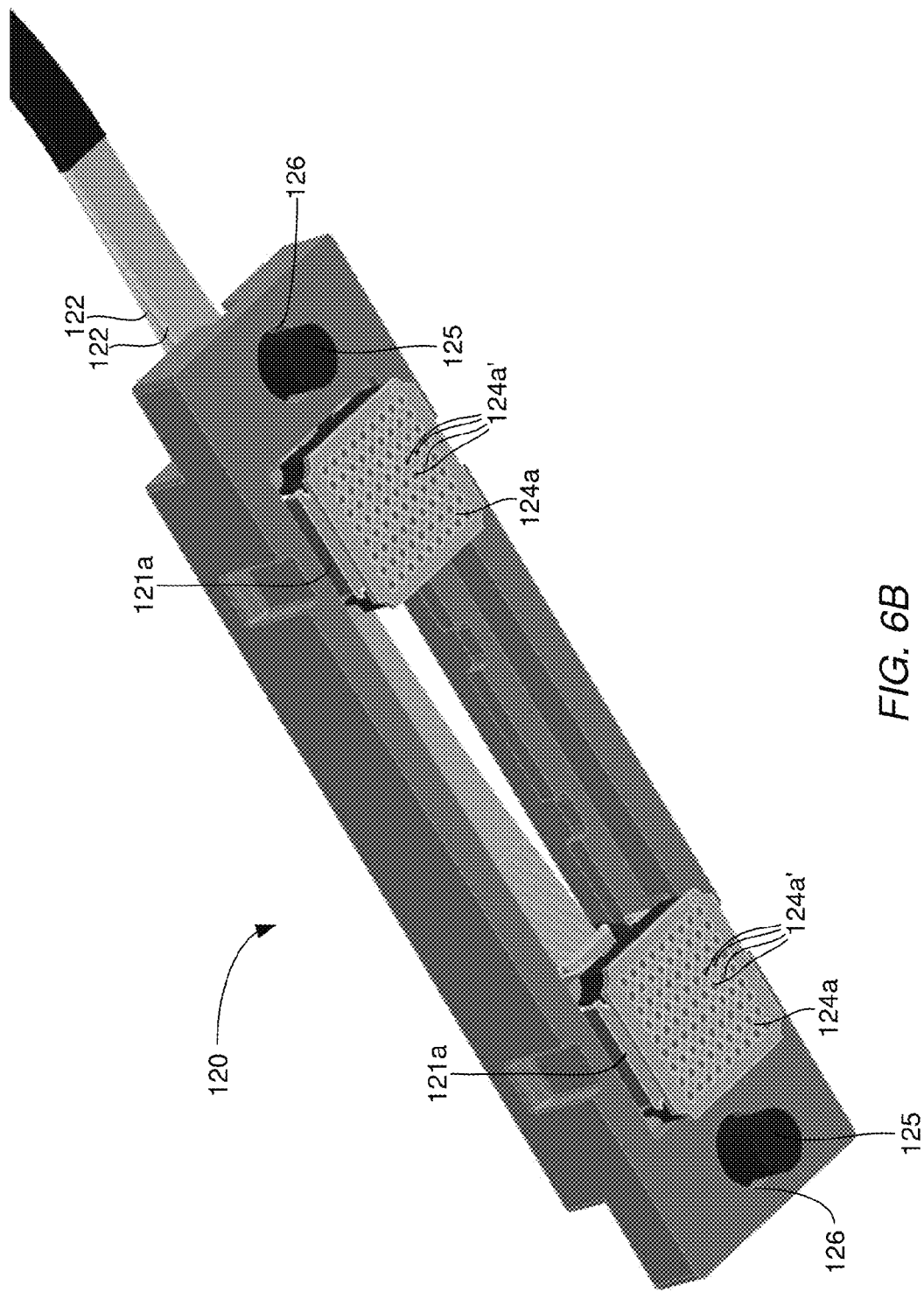
Figure 7:
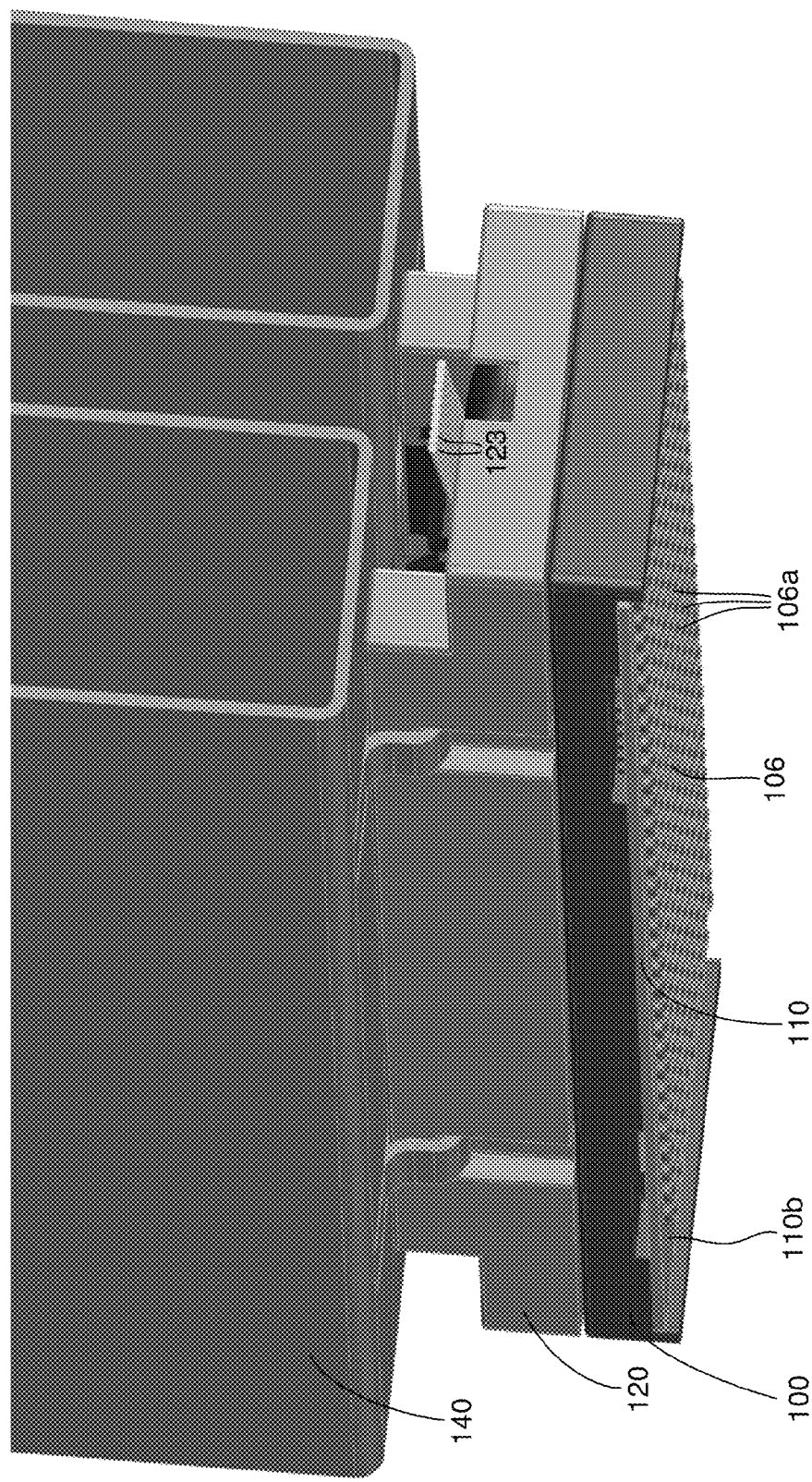
FIG. 7 illustrates a perspective view of the connector assembly, the module holder, and the heat sink device shown in FIG. 3 mechanically coupled together.

An illustrative embodiment of the connector assembly and the optical transceiver module holder will now be described with reference to FIGS. 3-7. FIG. 3 illustrates an exploded perspective view of the connector assembly 100, the parallel optical transceiver module holder 120, and a heat sink device 140. FIGS. 4A and 4B illustrate top and bottom perspective views, respectively, of the connector assembly 100 shown in FIG. 3. FIG. 5 illustrates a top perspective view of the assembly circuit board 110 of the connector assembly 100 shown in FIGS. 4A and 4B. FIGS. 6A and 6B illustrate top and bottom perspective views, respectively, of the module holder 120 shown in FIG. 3. FIG. 7 illustrates a perspective view of the connector assembly 100, the module holder 120, and the heat sink device 140 shown in FIG. 3 mechanically coupled together. The connector assembly 100, the holder 120 and the heat sink device 140 will now be described with reference to FIGS. 3-7.

The connector assembly 100 and the holder 120 are similar in some respects to the connector assembly and holder disclosed in U.S. Pat. No. 8,047,856 (hereinafter "the '856 patent"), which is assigned to the assignee of the present application and which is incorporated by reference herein in its entirety. One of the important differences between the connector assembly disclosed in the '856 patent and the connector assembly 100 of the present invention is that the assembly circuit board 110 of the connector assembly 100 has two gearbox ICs 101 mounted thereon and electrically connected thereto (FIG. 5). Each gearbox IC 101 (FIG. 5) is electrically interconnected to a respective parallel optical transceiver module 121 (FIGS. 6A and 6B) via a respective socket 102 (FIGS. 4A and 5) of the connector assembly 100 and via interconnection layers of the assembly circuit board 110 (FIG. 5).

The gearbox ICs 101 provide the same functionality as the gearbox IC 30 described above with reference to FIG. 2, but in accordance with this illustrative embodiment, each of the gearbox ICs 101 is configured to perform the following: convert twelve 10 Gbps electrical lanes inputted to the gearbox IC 101 from an ASIC into six 20 Gbps electrical lanes to be output to a respective optical transceiver module 121; and convert six 20 Gpbs electrical lanes inputted to the gearbox IC 101 from the respective optical transceiver module 121 into twelve 10 Gbps electrical lanes to be output from the gearbox IC 121 to an ASIC. Thus, in accordance with the illustrative embodiment shown in FIG. 2, each optical transceiver module 121 is a parallel optical transceiver module having six transmit channels and six receive channels. Each optical transceiver module 121 is connected to an end of a respective optical fiber ribbon cable 122 (FIG. 3) having six transmit and six receive optical fibers 123 (FIG. 7). In accordance with this illustrative embodiment, the opposite ends of the optical fiber ribbon cables 122 are connected to optical connectors 127, which are configured to be secured to a front panel (not shown).

Alternatively, one of the optical transceiver modules 121 may have twelve transmit channels and the other optical transceiver module 121 may have twelve receive channels, in which case one of the optical fiber ribbon cables 122 would have twelve transmit optical fibers 123 and the other optical fiber ribbon cable 122 would have twelve receive optical fibers 123. In both cases, each optical fiber 123 carries a 20 Gbps optical data signal.

It should be noted that the terms "optical transceiver module" and "optical communications module," as those terms are used herein, denote any of the following: (1) an optical transmitter module that has optical transmitter capabilities, but not optical receiver capabilities; (2) an optical receiver module that has optical receiver capabilities, but not optical transmitter capabilities; and (3) an optical transceiver module that has both optical receiver and optical transmitter capabilities.

The connector assembly 100 (FIGS. 4A and 4B) includes an assembly housing 103 and the assembly circuit board 110. Housing 103 has a generally rectangular, flat, chip-like shape defined by low wall portions 104 surrounding or enclosing inner portions 105 of assembly housing 103. The inner portions 105 define respective socket recesses through which respective arrays of electrical contacts 102a mounted on the upper surface 110a of the assembly circuit board 110 (FIG. 5) are exposed to form the respective sockets 102.

In accordance with an illustrative embodiment, the arrays of electrical contacts 102a are arrays of resilient electrical contacts of a type known in the art as a Landing Grid Array (LGA). Each contact of the arrays 102a comprises a spring finger 102a' that extends above the upper surface 110a of the assembly circuit board 110 at an acute angle with the upper surface 110a. That is, the base or proximal portion of each spring finger 102a' is on the upper surface 110a of the assembly circuit board 110a, and the distal portion of each spring finger 102a' is suspended above the upper surface 110a at an acute angle with the upper surface 110a. Although in the exemplary embodiment, the resilient contacts 102a' of the arrays 102a have the above-described structure, in other embodiments an array of resilient conductive contacts can have any other suitable structure. For example, in other embodiments the resilient portion can have a coiled or other curved portion and extend substantially vertically away from the upper surface 110a rather than at an acute angle.

In accordance with this exemplary embodiment, the lower surface 110b (FIG. 4B) of the assembly circuit board 110 has a Ball Grid Array (BGA) 106 or similar array of electrical contacts 106a. Although not shown for purposes of clarity, electrical pathways are provided through assembly circuit board 110 to electrically connect the electrical contacts (balls) 106a of BGA 106 to the electrical contacts 102a' of the arrays 102a.

As illustrated in FIGS. 6A and 6B, in the exemplary embodiment of the invention, the shape of the base portions 121a of the transceiver modules 121 corresponds or substantially conforms to the shape of the inner portions 105 (FIG. 4A) of housing 103 that defines the socket recesses. When the holder 120 is mated with the connector assembly 100 as shown in FIG. 7, the base portions 121a of the transceiver modules 121 are fitted within the respective socket recess defined by inner portions 105 (FIG. 4A). There can be, for example, a friction fit between base portions 121a of transceiver modules 121 and inner portions 105 that helps secure or stabilize the transceiver modules 121 and connector assembly 100 in this mated position.

Also, in the mated position shown in FIG. 7, the electrical contacts 102a' of the arrays 102a of the sockets 102 are resiliently deflected or displaced by respective electrically-conductive balls 124a of BGAs 124 (FIG. 6B) disposed on the lower surfaces of the base portions 121a of the transceiver modules 121 to promote good electrical contact.

A means for retaining transceiver modules 121 and connector assembly 110 in the mated position, such as a screw-based fastening system, is provided to counteract the resilient or spring force exerted by the resilient electrical contacts 102a'. In particular, screws 125 (FIGS. 6A and 6B) extend through holes 126 (FIG. 6B) formed in the holder 120 and engage threaded bores 107 (FIG. 4A) formed in the assembly housing 103. Although in this embodiment the retaining mechanism comprises screws and threaded bores, any other suitable mechanism may be used for this purpose.

The invention is not limited with respect to the type or configuration of the parallel optical transceiver modules 121 that are held in the holder 120 and mated with the sockets 102 of the connector assembly 100. A variety of known parallel optical transceiver modules are suitable for use with the invention, as will be understood by persons skilled in the art in view of the description being provided herein.

Once the connector assembly 110, the holder 120 and the heat sink device 140 have been mechanically coupled together as shown in FIG. 7, conventional surface-mount technology (SMT) soldering techniques can be used to electrically couple the electrical contacts 106a of BGA 106 disposed on the lower surface 110a of assembly circuit board 110 (FIG. 4B) to corresponding pads (not shown) disposed on an upper surface of a system circuit board, such as system circuit board 42 shown in FIG. 2. A bead of epoxy (not shown), commonly referred to as "underfill," can be added around the periphery of connector assembly 100 to promote mechanical stability between connector assembly 100 and system circuit board 42.

As illustrated in FIG. 5, additional electrical circuitry (components) 112 can be mounted on upper surface 110a of assembly circuit board 110. Such circuitry can include any suitable active or passive components, such as capacitors and IC chips. The electrical circuitry 112 can be electrically coupled to BGA 106 (FIG. 4B) and to electrical contacts 102a' (FIG. 4A) via one or more interconnection layers of the assembly circuit board 110. The circuitry 112 can be configured to perform any suitable function of a type that would be conventionally performed by either an optical transceiver module itself or circuitry connected to the optical transceiver module, such as power supply decoupling, signal equalization, clock-data recovery, and multi-level encoding.

In this manner, some of the transceiver-related functions that conventionally may be performed in an optical transceiver module or in an electronic system (not shown) to which a conventional optical transceiver module is connected, such as a switching system or processing system, can instead be performed in connector assembly 100. Stated another way, connector assembly 100 can serve not only as an electrical connector but also as an electronic subsystem for the optical transceiver modules 121 and/or for other systems components that are electrically connected to the system circuit board 142.

One or more interconnection layers of assembly circuit board 110 can be used to route a signal from any of electrical contacts 102a' (FIG. 4A) to any of the ball contacts 106a of BGA 106 (FIG. 4B). Thus, while in some cases an electrical contact 102a' can be connected by a vertical conductive path (not shown) in the interconnection layer directly to a ball contact 106a located underneath it, the interconnection layer also includes horizontal conductive paths (i.e., circuit traces) that route signals to and from different locations on assembly circuit board 110, such as to I/O pads of the gearbox ICs 101 (FIG. 5). In this way, electrical signals are transmitted between the ASICs 50 (FIG. 2) and the gearbox ICs 101 and between the gearbox ICs 101 and the optical transceiver modules 121.

It should be noted that illustrative or exemplary embodiments of the invention have been described above with reference to the figures for the purposes of demonstrating the principles and concepts of the invention. Those skilled in the art will understand, in view of the description provided herein, that the invention is not limited to these illustrative embodiments and that many modifications can be made to these embodiments without deviating from the invention. For example, the invention is not limited with respect to the number of gearbox ICs that are included in the connector assembly, the number of optical transceiver modules that are mated with the connector assembly, the shape of the connector assembly, the holder or the heat sink device, the system circuit board on which the connector assembly is mounted, etc.

What is claimed is:

1. A connector assembly for interconnecting one or more parallel optical transceiver modules with a system circuit board, the connector assembly comprising:

an assembly housing having at least a first socket recess formed in an upper surface of the assembly housing for receiving a base portion of a first parallel optical transceiver module, the first socket recess having a shape substantially corresponding to a shape of the base portion of the first parallel optical transceiver module;

an assembly circuit board attached to the assembly housing, the assembly circuit board having an upper surface and a lower surface, the assembly housing covering the upper surface of the assembly circuit board except where said at least a first socket recess is formed in the upper surface of the assembly housing, and wherein a first area of the upper surface of the assembly circuit board is exposed through the first socket recess, and wherein at least a first socket is disposed on the exposed first area of the upper surface of the assembly circuit board, the first socket comprising a first array of electrical contacts for making electrical contact with a second array of electrical contacts disposed on a lower surface of the base portion of the first parallel optical transceiver module when the base portion is received in the first socket recess, the lower surface of the assembly circuit board having a third array of electrical contacts disposed thereon for making contact with a fourth array of electrical contacts disposed on an upper surface of the system circuit board when the connector assembly is mounted on the upper surface of the system circuit board; and at least a first gearbox integrated circuit (IC) for performing data rate conversion mounted on and electrically connected to the assembly circuit board, and wherein the first gearbox IC is electrically connected to the first array of electrical contacts via electrical traces of the assembly circuit board.

2. The connector assembly of claim 1, further comprising:

at least a second socket recess formed in the upper surface of the assembly housing for receiving a base portion of a second parallel optical transceiver module, the second socket recess having a shape substantially corresponding to a shape of the base portion of the second parallel optical transceiver module, and wherein a second area of the upper surface of the assembly circuit board is exposed through the second socket recess, and wherein at least a second socket is disposed on the exposed second area of the upper surface of the assembly circuit board, the second socket comprising a fifth array of electrical contacts for making electrical contact with a sixth array of electrical contacts disposed on a lower surface of the base portion of the second parallel optical transceiver module when the base portion of the second parallel optical transceiver module is received in the second socket recess; and at least a second gearbox IC for performing data rate conversion mounted on and electrically connected to the assembly circuit board, and wherein the second gearbox IC is electrically connected to the fifth array of electrical contacts via electrical traces of the assembly circuit board.

3. The connector assembly of claim 2, wherein the first array of electrical contacts is a landing grid array (LGA) and wherein the second array of electrical contacts is a ball grid array (BGA).

4. The connector assembly of claim 3, wherein the third array of electrical contacts is a BGA.

5. The connector assembly of claim 4, wherein the fifth array of electrical contacts is an LGA and wherein the sixth array of electrical contacts is a BGA.

6. The connector assembly of claim 2, wherein the first and second gearbox ICs are configured to convert first and second sets, respectively, of N electrical data signals having a data rate of X gigabits per second (Gpbs) that are inputted to the assembly circuit board from the system circuit board into first and second sets, respectively, of N/2 electrical data signals having a data rate of 2X Gbps to be outputted to the first and second parallel optical transceiver modules, respectively, and wherein the first and second gearbox ICs are configured to convert first and second sets, respectively, of N/2 electrical data signals having a data rate of 2X Gbps that have been inputted to the assembly circuit board from the first and second parallel optical transceiver modules, respectively, into first and second sets, respectively, of N electrical data signals having a data rate X Gbps to be outputted to the system circuit board, wherein N is a positive integer that is equal to or greater than two and X as a positive number that is equal to or greater than one.

7. An optical communications system comprising:
a system circuit board having at least a first array of electrical contacts disposed on an upper surface of the system circuit board;
at least a first application specific integrated circuit (ASIC) mounted on the system circuit board and electrically connected thereto;
a connector assembly mounted on the system circuit board, the connector assembly comprising an assembly housing and an assembly circuit board attached to the assembly housing, the assembly housing having at least a first socket recess formed in an upper surface of the assembly housing for receiving a base portion of a first parallel optical transceiver module, wherein a first area of an upper surface of the assembly circuit board is exposed through the first socket recess, a first socket being disposed on the exposed first area of the upper surface of the assembly circuit board, the first socket comprising a second array of electrical contacts, the assembly circuit board having a third array of electrical contacts disposed on a lower surface thereof, the third array being electrically connected to the first array;
a parallel optical transceiver module holder mechanically coupled to the assembly housing, the module holder holding at least the first parallel optical transceiver module such that the base portion of the first parallel optical transceiver module is disposed in the first socket recess, wherein a fourth array of electrical contacts disposed on a lower surface of the base portion is in contact with the second array of electrical contacts of the first socket; and
at least a first gearbox integrated circuit (IC) for performing data rate conversion mounted on and electrically connected to the assembly circuit board, and wherein the first gearbox IC is electrically connected to the second array of electrical contacts via electrical traces of the assembly circuit board.

8. The optical communications system of claim 7, further comprising:
at least a second socket recess formed in the upper surface of the assembly housing for receiving a base portion of a second parallel optical transceiver module, the module holder holding at least the second parallel optical transceiver module, and wherein a second area of the upper surface of the assembly circuit board is exposed through the second socket recess, and wherein at least a second socket is disposed on the exposed second area of the upper surface of the assembly circuit board, the second socket comprising a fifth array of electrical contacts, the base portion of the second parallel optical transceiver module being disposed in the second socket recess such that the fifth array of electrical contacts are in contact with a sixth array of electrical contacts disposed on a lower surface of the base portion of the second parallel optical transceiver module; and
at least a second gearbox IC for performing data rate conversion mounted on and electrically connected to the assembly circuit board, and wherein the second gearbox IC is electrically connected to the fifth array of electrical contacts via electrical traces of the assembly circuit board.

9. The optical communications system of claim 8, wherein the second array of electrical contacts is a landing grid array (LGA) and wherein the fourth array of electrical contacts is a ball grid array (BGA).

10. The optical communications system of claim 9, wherein the third array of electrical contacts is a BGA.

11. The optical communications system of claim 10, wherein the fifth array of electrical contacts is an LGA and wherein the sixth array of electrical contacts is a BGA.

12. The optical communications system of claim 8, wherein the first and second gearbox ICs are configured to convert first and second sets, respectively, of N electrical data signals having a data rate of X gigabits per second (Gpbs) that are inputted to the assembly circuit board from the system circuit board into first and second sets, respectively, of N/2 electrical data signals having a data rate of 2X Gbps to be outputted to the first and second parallel optical transceiver modules, respectively, and wherein the first and second gearbox ICs are configured to convert first and second sets, respectively, of N/2 electrical data signals having a data rate of 2X Gbps that have been inputted to the assembly circuit board from the first and second parallel optical transceiver modules, respectively, into first and second sets, respectively, of N electrical data signals having a data rate X Gbps to be outputted to the system circuit board, wherein N is a positive integer that is equal to or greater than two and X as a positive number that is equal to or greater than one.

13. The optical communications system of claim 8, further comprising:
   a heat sink device mechanically coupled to the module holder.

14. A method for using a connector assembly to electrically connect one or more parallel optical transceiver modules to a system circuit board, the method comprising:
   providing the system circuit board, the system circuit board having at least a first application specific integrated circuit (ASIC) mounted on a surface of the system circuit board and electrically connected to the system circuit board, the system circuit board having a first array of electrical contacts disposed on a surface thereof; and
   mounting a connector assembly on a surface of the system circuit board, the connector assembly comprising an assembly housing and an assembly circuit board attached to the assembly housing, the assembly circuit board having a second array of electrical contacts disposed on a lower surface thereof that is in contact with the first array of electrical contacts of the system circuit board, the assembly housing having at least a first socket recess formed in an upper surface of the assembly housing for receiving a base portion of a first parallel optical transceiver module, wherein a first area of an upper surface of the assembly circuit board is exposed through the first socket recess, a first socket being disposed on the exposed first area of the upper surface of the assembly circuit board, the first socket comprising a third array of electrical contacts, wherein a parallel optical transceiver module holder is mechanically coupled to the assembly housing, the module holder holding at least the first parallel optical transceiver module such that a base portion of the first parallel optical transceiver module is disposed in the first socket recess, wherein a fourth array of electrical contacts disposed on a lower surface of the base portion is in contact with the third array of electrical contacts of the first socket, and wherein at least a first gearbox integrated circuit (IC) for performing data rate conversion is mounted on and electrically connected to the assembly circuit board, and wherein the first gearbox IC is electrically connected to the third array of electrical contacts via electrical traces of the assembly circuit board.

15. The method of claim 14, wherein at least a second socket recess is formed in the upper surface of the assembly housing for receiving a base portion of a second parallel optical transceiver module, the module holder holding at least the second parallel optical transceiver module, and wherein a second area of the upper surface of the assembly circuit board is exposed through the second socket recess, and wherein at least a second socket is disposed on the exposed second area of the upper surface of the assembly circuit board, the second socket comprising a fifth array of electrical contacts, the base portion of the second parallel optical transceiver module being disposed in the second socket recess such that the fifth array of electrical contacts are in contact with a sixth array of electrical contacts disposed on a lower surface of the base portion of the second parallel optical transceiver module, and wherein at least a second gearbox IC for performing data rate conversion is mounted on and electrically connected to the assembly circuit board, and wherein the second gearbox IC is electrically connected to the fifth array of electrical contacts via electrical traces of the assembly circuit board.

16. The method of claim 15, wherein the third array of electrical contacts is a landing grid array (LGA) and wherein the fourth array of electrical contacts is a ball grid array (BGA).

17. The method of claim 16, wherein the second array of electrical contacts is a BGA.

18. The method of claim 17, wherein the fifth array of electrical contacts is an LGA and wherein the sixth array of electrical contacts is a BGA.

19. The method of claim 18, further comprising:
   soldering respective electrical contacts of the first and second arrays of electrical contacts together during the step of mounting the connector assembly on the surface of the system circuit board.

20. The method of claim 15, wherein the first and second gearbox ICs are configured to convert first and second sets, respectively, of N electrical data signals having a data rate of X gigabits per second (Gpbs) that are inputted to the assembly circuit board from the system circuit board into first and second sets, respectively, of N/2 electrical data signals having a data rate of 2X Gbps to be outputted to the first and second parallel optical transceiver modules, respectively, and wherein the first and second gearbox ICs are configured to convert first and second sets, respectively, of N/2 electrical data signals having a data rate of 2X Gbps that have been inputted to the assembly circuit board from the first and second parallel optical transceiver modules, respectively, into first and second sets, respectively, of N electrical data signals having a data rate X Gbps to be outputted to the system circuit board, wherein N is a positive integer that is equal to or greater than two and X as a positive number that is equal to or greater than one.

21. The method of claim 15, further comprising:
   mechanically coupling a heat sink device to the module holder.

* * * * *